(12) United States Patent
Ishihara et al.

(10) Patent No.: US 6,335,826 B1
(45) Date of Patent: Jan. 1, 2002

(54) INTERCONNECTION OF ZOOM OPERATING MEMBER AND ZOOM DRIVE MEMBER

(75) Inventors: Naoki Ishihara, Sakai; Masato Kato, Otsu, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/456,331

(22) Filed: Dec. 8, 1999

(30) Foreign Application Priority Data

Dec. 8, 1998 (JP) ............................................. 10-348139

(51) Int. Cl.⁷ .............................. G02B 7/10; G02B 7/12; G02B 23/18
(52) U.S. Cl. ........................................ 359/422; 359/414
(58) Field of Search ........................ 359/422, 412–418, 359/421, 425, 426

(56) References Cited

U.S. PATENT DOCUMENTS 4,396,257 A * 8/1983 Nakamura .................. 359/414
4,605,288 A * 8/1986 Shimofuruta ............... 359/414
4,616,907 A * 10/1986 Nakamura .................. 359/414

FOREIGN PATENT DOCUMENTS

GB          586048 B * 8/1944 ................. 359/413
JP         09189839       7/1997

* cited by examiner

Primary Examiner—Jon Henry
(74) Attorney, Agent, or Firm—Burns, Doane, Swecker & Mathis, LLP

(57) ABSTRACT

A gear is formed on the outer circumference of the disk unit 20a of the zoom operating member 20 and on the outer circumference of the right zoom drive member 18, and an intermediate gear 19 that engages and connects with each of these gears is located between them. In other words, the zoom operating member 20 and the right zoom drive member 18 are connected to each other in a non-integrated fashion. When the zoom operating member 20 is manually rotated around the eye distance adjustment axis 22, the right zoom drive member 18 rotates via the intermediate gear 19 and the left zoom drive member 21 simultaneously rotates via the connecting member 11.

45 Claims, 7 Drawing Sheets

(a)

(b)

PRIOR ART

PRIOR ART

INTERCONNECTION OF ZOOM OPERATING MEMBER AND ZOOM DRIVE MEMBER

This application is based on application No. Hei 10-348139 filed in Japan, the content of which is hereby incorporated by reference.

BACKGROUND OF THE INVENTION

1. Field of the Invention

The present invention pertains to binoculars capable of performing zooming.

2. Description of the Prior Art

In the conventional construction of zoom binoculars, the zoom operating member is located around the right eyepiece optical system and zooming is performed by rotating the member around the optical axis of the right eyepiece optical system. FIG. 8 shows the construction of conventional zoom binoculars. It shows one example of Porro prism binoculars using a structure in which the eye distance, i.e. distance of two optical axes, is adjusted using one shaft as the rotating axis. Portion (a) of FIG. 8 is a longitudinal sectional plan view and (b) is a transverse sectional front elevation.

Numeral 6 indicates eyepiece zoom optical systems. Each eyepiece zoom optical system is mounted inside a movable lens holder 5 having an essentially cylindrical configuration such that the eyepiece optical axis 9 runs through its center. The movable lens holder 5 is movably engaged with an essentially cylindrical cam 8 located around the lens holder 5. A cam pin 4 protrudes outward from the outer circumference of the movable lens holder 5. It extends through a cam groove of the cam 8 and reaches a guide member 7 located outside the cam 8. The guide member 7 has a guide groove 10. By means of the cam pin 4 engaging with the guide groove 10, the movable lens holder 5 is guided straight forward or backward along the eyepiece optical axis 9.

An essentially cylindrical right zoom drive member 18 is located around the outer circumference of the right guide member 7. As shown in (b) of FIG. 8, a zoom operating member 13 protrudes outward from the outer circumference of the right zoom drive member 18. By manually operating this member 13 in the directions indicated by the two-headed arrow, the right zoom drive member 18 rotates around the right eyepiece optical axis 9. Further, a claw 18a protrudes from one end of the right zoom drive member 18. By means of the claw 18a engaging with the right cam member 8, the rotational movement of the right zoom drive member 18 is transmitted to the right cam member 8.

An essentially cylindrical left zoom drive member 21 is located around the outer circumference of the left guide member 7. This left zoom drive member 21 is linked to the right zoom drive member 18. When the right zoom drive member 18 rotates, the left zoom drive member 21 rotates around the left eyepiece optical axis 9. The mechanism by which the rotational movement of the left zoom drive member 21 is transmitted to the left cam 8 is the same as for the right unit.

Based on this construction, the left and right cams 8 rotate their respective eyepiece optical axes 9, and the rotational movement of the left and right cams 8 is transmitted to the left and right cam pins 4 through the cam grooves, respectively, whereupon the left and right movable lens holders 5 move along the eyepiece optical axes 9 and zooming is achieved.

The rotational movement of the right zoom drive member 18 is transmitted to the left zoom drive member 21 by means of a connecting member 11, which comprises an elastic member having a long and narrow plate spring configuration. In other words, engaging portions 11a and 11b are located on either end of the connecting member 11, and these engage and link with one portion of the outer circumference of the right zoom drive member 18 and one portion of the outer circumference of the left zoom drive member 21, respectively. The connecting member 11 is constructed such that it passes through the eye distance adjusting axis 22. The reason for this is explained below.

In binoculars, the left and right eyepiece optical systems are connected to each other such that they can rotate around the eye distance adjusting axis 22 for the purpose of so-called eye distance adjustment, by which the distance between the left and right eyepiece optical axes 9 is adjusted to match the distance between the eyes of the user. If the connecting member 11 did not pass through the eye distance adjusting axis 22, when the left and right eyepiece optical systems rotated around the axis 22, the positional relationship between the right zoom drive member 18 and the left zoom drive member 21 would change.

FIG. 9 shows another conventional technology.

The binoculars shown in FIG. 9 comprise three units, i.e., a housing 15 and left and right optical units 16 and 17 incorporated in the housing. They comprise Porro prism binoculars using a structure in which the eye distance is adjusted around two axes.

A zoom operating member 14 is located in the center of the binoculars, and a zoom mechanism 35 is located in the housing 15. By operating the zoom operating member 14 in the directions indicated by the two-headed arrow, the zoom mechanism 35 moves left or right, by which the connecting member 11 is driven left or right and the right zoom drive member 18 and left zoom drive member 21 rotate together. The locational relationships among the cam pins 4, movable lens holders 5, guide members 7, cams 8 and eyepiece optical axes 9 are the same as in the binoculars shown in FIG. 8.

In the first construction, the zoom operating member 13 rotates essentially as one unit with the cam 8, and therefore, the construction must be such that the zoom operating member 13 rotates around the eyepiece optical axis 9. This creates the problems that there is little freedom in arranging the components and the zooming operation is difficult.

If it were attempted to use the second construction in binoculars using the method in which the eye distance is adjusted around one axis, it would become impossible to have the connecting member 11 pass through the eye distance adjusting axis. Therefore, the construction shown in FIG. 9, in which there are two (left and right) rotational axes for eye distance adjustment (not shown in the drawing) must be used, which creates the problem that the binoculars comprise three units and the entire mechanism becomes larger in size to the extent of the housing 15.

SUMMARY OF THE INVENTION

In view of these problems, the object of the present invention is to provide compact zoom binoculars in which the zoom operating member is in a location that allows easy operation.

In order to attain this object, one aspect of the present invention has a zoom operating member and left and right zoom drive members connected to each other, wherein one of the left and right zoom drive members is connected to and moves together with the zoom operating member in a non-integrated fashion.

In addition, the connecting member that connects the left and right zoom drive members is located such that it passes through the eye distance adjusting axis. The zoom operating member is located above the eye distance adjusting axis. The zoom operating member is connected to the zoom drive member on the side at which a focus drive member is located. There is one eye distance adjusting axis.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
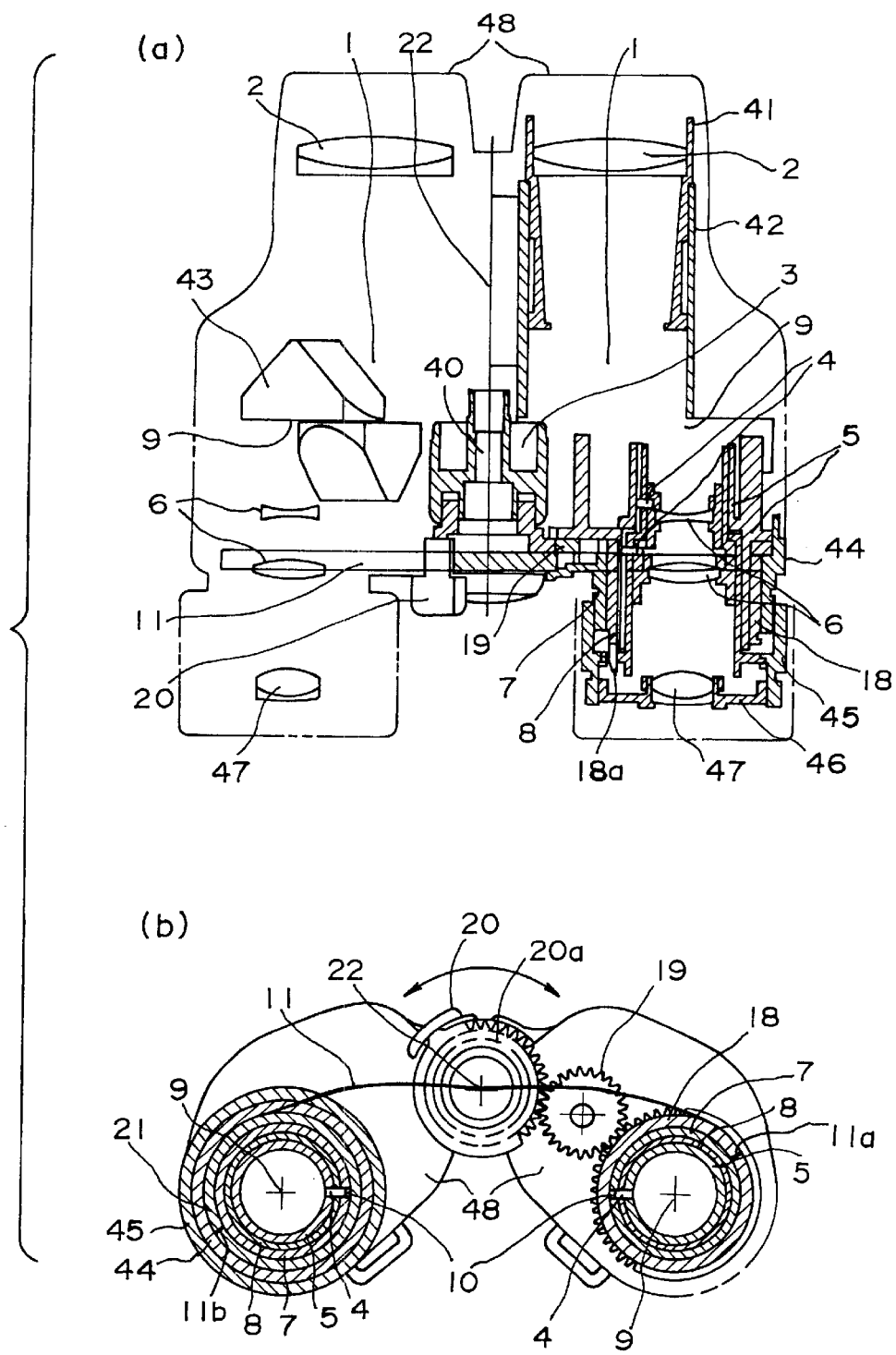
FIG. 1 shows the construction of a first embodiment of the present invention.

The embodiments of the present invention are described below with reference to the drawings. FIG. 1 shows the construction of a first embodiment of the present invention, which comprises Porro prism binoculars wherein the eye distance is adjusted using one axis as the center of rotation. The portion (a) is a longitudinal sectional plan view and (b) is a transverse sectional front elevation. In this drawing, numeral 1 indicates an object optical axis, 2 indicates an object optical system and 3 indicates a focusing ring.

Each object optical system 2 is mounted near the front end of and inside an essentially cylindrical object lens holder 41, which has an object optical axis 1 as its center. The object lens holders 41 are engaged with the main unit frame 42 such that they can move along the object optical axes 1. When the focusing ring 3 at the center of the main unit rotates around the eye distance adjusting axis 22 by being operated manually to rotate around the rotational shaft 40, the rotational movement is converted into straight movement by means of a drive shaft not shown in the drawing, and is transmitted to the object lens holders 41, whereby they move along the object optical axes 1 using the main unit frame 42 as the guide, and focusing is performed.

In this embodiment, of the left and right units relative to the eye distance adjusting axis 22, which is located in the center, the right unit is fixed. In other words, the left unit rotates around the eye distance adjusting axis 22 relative to the right unit. Further, the focusing ring 3 is maintained on the fixed unit. Conversely, if the left unit is fixed, the construction should be such that the left and right units are reversed in the explanations given above.

On the other hand, numeral 6 indicates eyepiece zoom optical systems. Each eyepiece zoom optical system is mounted inside an essentially cylindrical movable lens holder 5, which has an eyepiece optical axis 9 at its center. The movable lens holder 5 engages with an essentially cylindrical cam 8 that is located around the lens holder. A cam pin 4 protrudes outward from the outer circumference of the movable lens holder 5. The cam pin 4 extends through a cam groove of the cam 8, and reaches the guide member 7 that is located outside the cam 8. Each guide member 7 has a guide groove 10. By means of the cam pin 4 becoming engaged with the guide groove 10, the movable lens holder 5 is guided straight forward or backward along the eyepiece optical axis 9.

Between the object optical system 2 and the eyepiece zoom optical system 6 is a Porro prism 43. It optically connects the object optical axis 1 and the eyepiece optical axis 9, so that an erect object image may be led to the eyes of the user. While the cam 8 has an essentially cylindrical configuration in this embodiment, it is not limited to this configuration. Plate-like cams may be used, for example. In addition, the construction inside the zoom binoculars explained above is symmetrical relative to a centerline, but the drawing contains some omissions.

An essentially cylindrical right zoom drive member 18 is located on the outer circumference of the right guide member 7.

An essentially cylindrical left zoom drive member 21 is located on the outer circumference of the left guide member 7. This left zoom drive member 21 is linked to the right zoom drive member 18, such that when the right zoom drive member 18 rotates, the left zoom drive member 21 similarly rotates around the left eyepiece optical axis 9. The mechanism by which the rotational movement of the left zoom drive member 21 is transmitted to the left cam 8 is the same as in the right unit.

Using the construction explained above, the left and right cams 8 rotate around the left and right eyepiece optical axes 9, respectively, and the rotational movement of each cam 8 is transmitted to the left or right cam pin 4 through a cam groove, whereby the left and right movable lens holders 5 move along the eyepiece optical axes 9 and zooming is performed. A cover 44 and an outer sheath 45 are located around the outer circumference of each zoom drive member (21 or 18). A disk-like eyepiece lens holder 46 is mounted near the rear end of and inside the outer sheath 45, and an eyepiece lens 47 is mounted at the center of the lens holder with the eyepiece optical axis 9 as its center. The eyepiece optical system comprises this eyepiece lens 47 and eyepiece zoom optical system 6.

The rotational movement of the right zoom drive member 18 is transmitted to the left zoom drive member 21 via the connecting member 11 comprising an elastic member having a long and narrow plate spring configuration. In other words, engaging portions 11a and 11b are located at either end of the connecting member 11, and they engage with one portion of the outer circumference of the right zoom drive member 18 and left zoom drive member 21, respectively. The connecting member 11 is constructed such that it passes through the eye distance adjusting axis 22.

Further, in this embodiment, a zoom operating member 20 is located above the eye distance adjusting axis 22.

A gear is formed on the outer circumference of the disk unit 20a of the zoom operating member 20. A similar gear is also formed on the outer circumference of the right zoom drive member 18. An intermediate gear 19 that engages and links with each of these gears is located between the two gears. In other words, the zoom operating member 20 and the right zoom drive member 18 are do not comprise one unit but are connected to each other. When the zoom operating member 20 is manually rotated in the direction indicated by the two-headed arrow around the eye distance adjusting axis 22, the right zoom drive member 18 rotates via the intermediate gear 19, and the left zoom drive member 21 simultaneously rotates via the connecting member 11.

Using this construction, the left and right cams 8 rotate around the left and right eyepiece optical axes 9, respectively, and their rotational movement is transmitted to the left and right cam pins 4 via the cam grooves, whereupon the left and right movable lens holders 5 move along the eyepiece optical axes 9 and zooming is performed. While an intermediate gear 19 is used in this embodiment, it is also acceptable if the zoom operating member 20 and the right zoom drive member 18 directly engage with each other if space permits. By having a zoom operating member 20 in the center of the binoculars, as in this embodiment, it can be operated using either hand. This construction also allows natural operation while holding the device, providing ease of operation.

Figure 2:
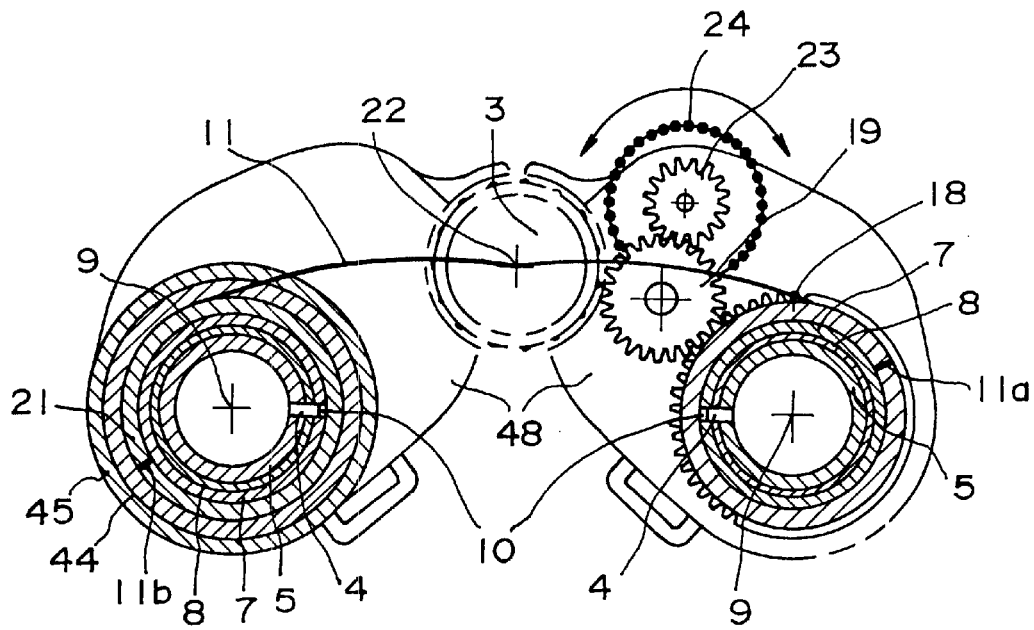
FIG. 2 shows the construction of a second embodiment of the present invention.

FIG. 2 is a transverse sectional front elevation showing the construction of a second embodiment of the present invention. As shown in the drawing, in this embodiment, a zoom operating member 24 is located at the right upper area relative to the center of the binoculars in place of the zoom operating member 20 shown in FIG. 1, and a gear 23 that coaxially rotates together with the zoom operating member 24 is engaged with an intermediate gear 19. The outer circumference of the zoom operating member 24 is knurled in order to prevent slipping during manual operation. When the zoom operating member 24 is manually rotated in the direction indicated by the two-headed arrow, the gear 23 rotates and the right drive member 18 rotates via the intermediate gear 19. The rest of the construction is the same as the first embodiment.

Figure 3:
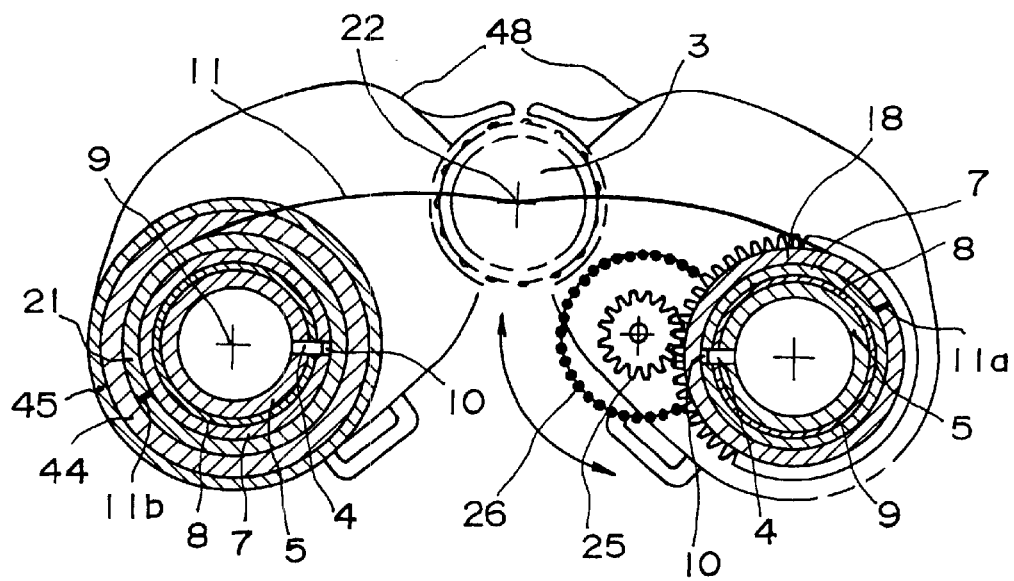
FIG. 3 shows the construction of a third embodiment of the present invention.

FIG. 3 is a transverse sectional front elevation showing the construction of a third embodiment of the present invention. As shown in the drawing, in this embodiment the intermediate gear 19 is eliminated. Instead, a zoom operating member 26 is located to the right lower area relative to the center of the binoculars, and a gear 25 that coaxially rotates together with the zoom operating member 26 directly engages with the right zoom drive member 18. The outer circumference of the zoom operating member 26 is knurled in order to prevent slipping during manual operation. When the zoom operating member 26 is manually rotated in the direction indicated by the two-headed arrow, the gear 25 rotates and the right zoom drive member 18 rotates. The rest of the construction is the same as in the first embodiment.

Figure 4:
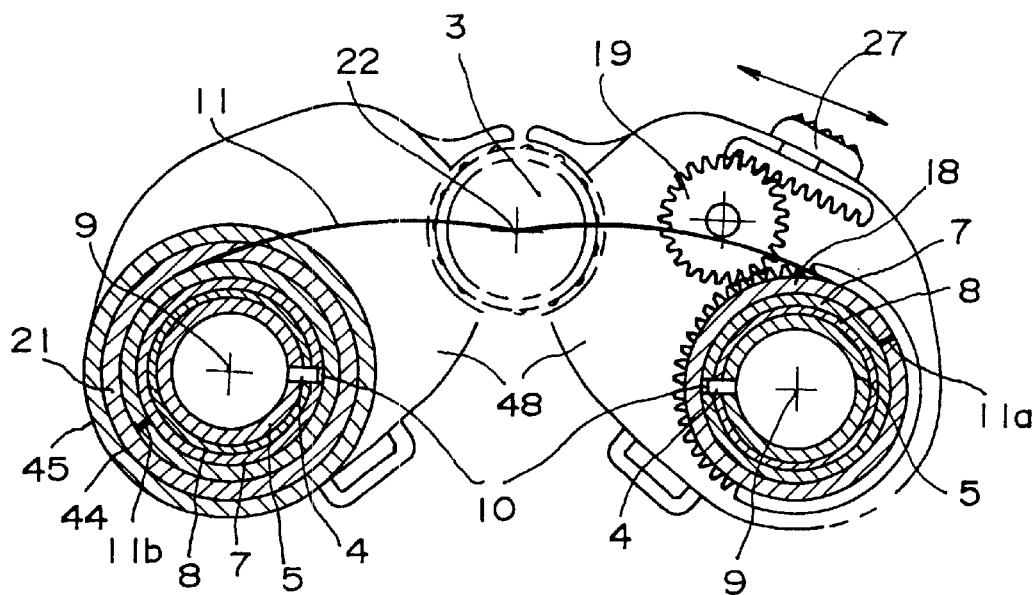
FIG. 4 shows the construction of a fourth embodiment of the present invention.

FIG. 4 is a transverse sectional front elevation showing the construction of a fourth embodiment of the present invention. As shown in the drawing, in this embodiment, a sliding zoom operating member 27 is located at the right upper area relative to the center of the binoculars, in place of the zoom operating member 20 shown in FIG. 1. A rack is formed by providing a gear to the zoom operating member, and the rack engages with an intermediate gear 19, which is equivalent to a pinion for the rack. When the zoom operating member 27 is manually slid in the directions indicated by the two-headed arrow, the right zoom drive member 18 rotates via the intermediate gear 19. The rest of the construction is the same as in the first embodiment. As in the second through fourth embodiments, by locating the zoom operating member at the right upper area or right lower area relative to the center of the binoculars, operation must be performed using the right hand, but a construction with better ease of operation can be obtained.

Figure 5:
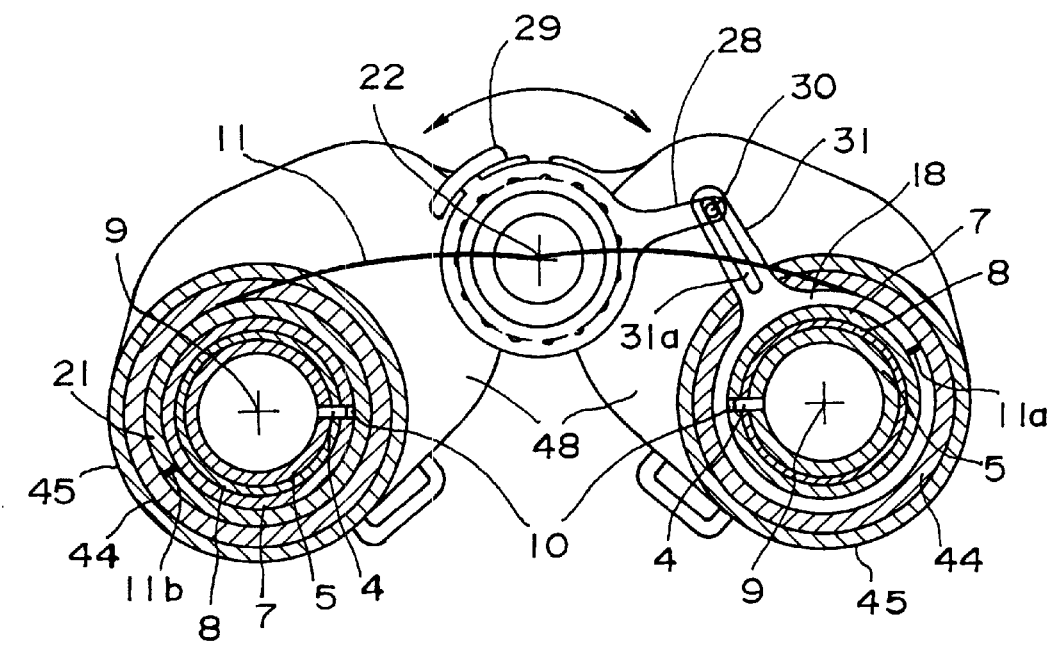
FIG. 5 shows the construction of a fifth embodiment of the present invention.

FIG. 5 is a transverse sectional front elevation showing the construction of a fifth embodiment of the present invention. As shown in the drawing, in this embodiment, a zoom operating member 29 is located above the eye distance adjusting axis 22. A lever 28 protrudes outward from the outer circumference of the zoom operating member 29. A pin 30 is located at the tip of the lever. on the other hand, a lever 31 protrudes outward from the outer circumference of the right zoom drive member 18. An elongated hole 31*a* is formed along the length of the lever, and the pin 30 is engaged with this hole.

When the zoom operating member 29 is manually rotated in the directions indicated by the two-headed arrow, the lever 28 rotates and the pin 30 moves inside the elongated hole 31*a*. Based on this movement, the rotational movement is transmitted from the lever 31 to the right zoom drive member 18, whereby the right zoom drive member 18 rotates. The rest of the construction is the same as in the first embodiment.

Figure 6:
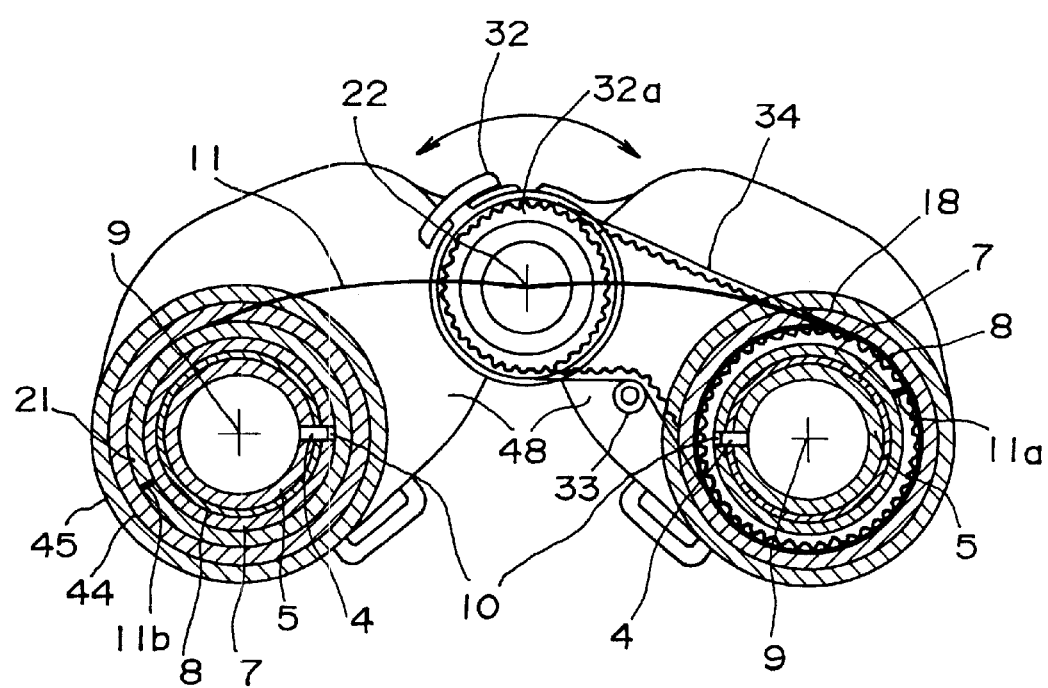
FIG. 6 shows the construction of a sixth embodiment of the present invention.

FIG. 6 is a transverse sectional front elevation showing the construction of a sixth embodiment of the present invention. As shown in the drawing, in this embodiment, a zoom operating member 32 is located above the eye distance adjusting axis 22 and is connected to the right zoom drive member 18 by means of a timing belt 34. By giving the disk unit 32*a* of the zoom operating member 32 and the right zoom drive member 18 the function of a timing pulley and having them engage with the timing belt 34, the rotational movement may be more reliably transmitted. Numeral 33 indicates a tension roller.

When the zoom operating member 32 is manually rotated in the directions indicated by the two-headed arrow around the eye distance adjusting axis 22, the right zoom drive member 18 rotates via the belt 34. The rest of the construction is the same as in the first embodiment. Based on the constructions of the fifth and sixth embodiments, smooth transmission of rotational movement without any backlash may be made possible.

Figure 7:
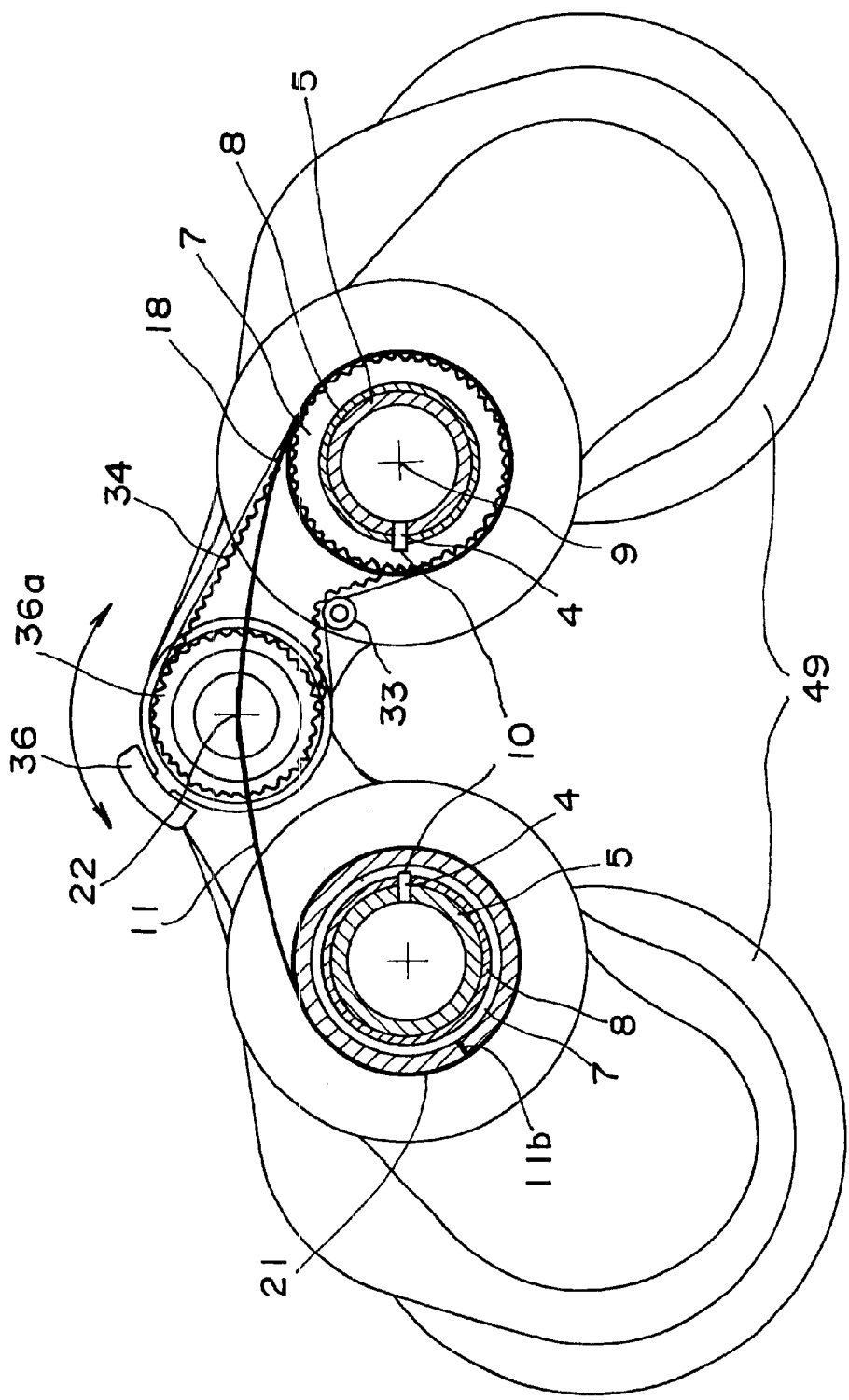
FIG. 7 shows the construction of a seventh embodiment of the present invention.
Figure 8:
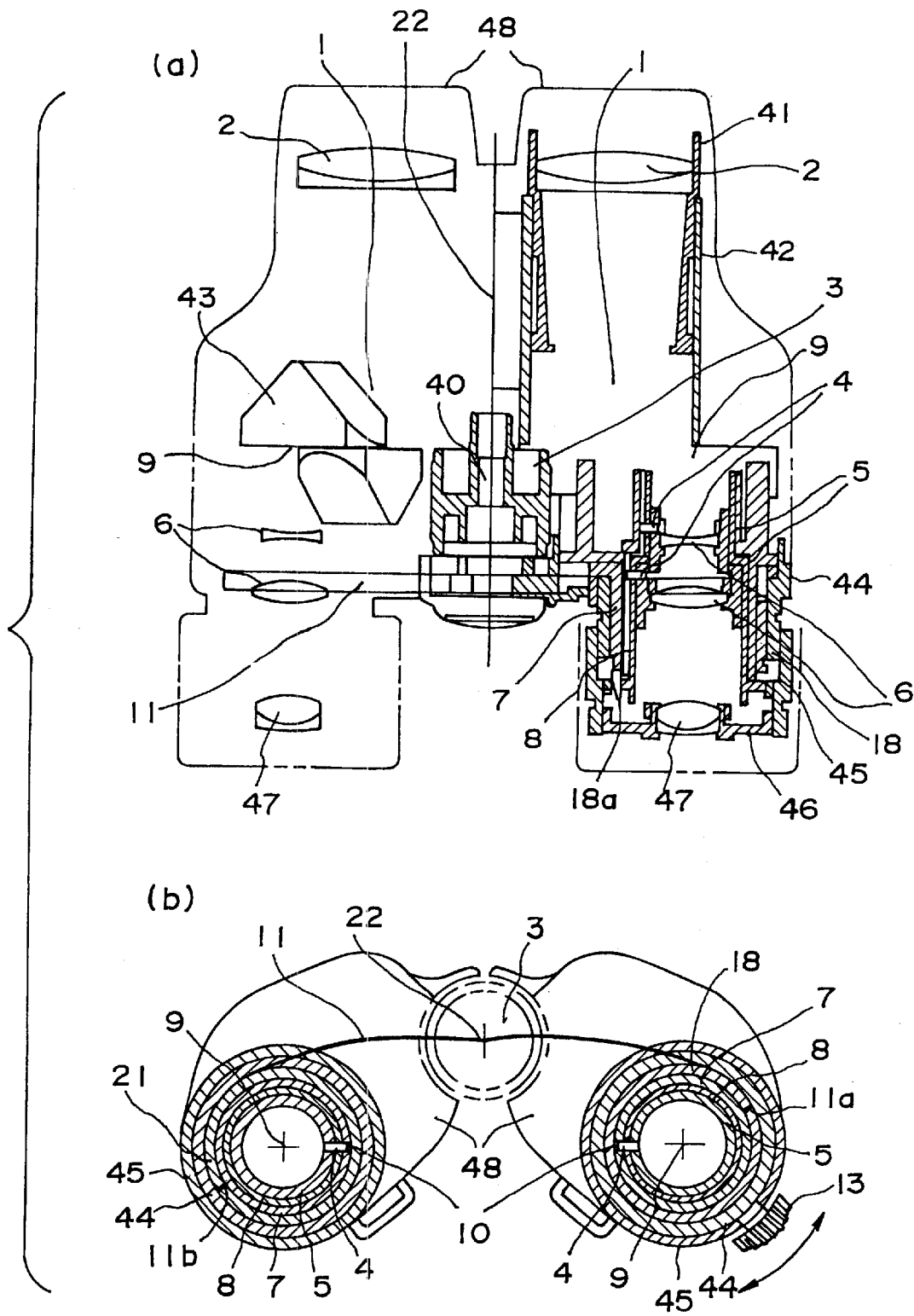
FIG. 8 shows the construction of a conventional pair of zoom binoculars.
Figure 9:
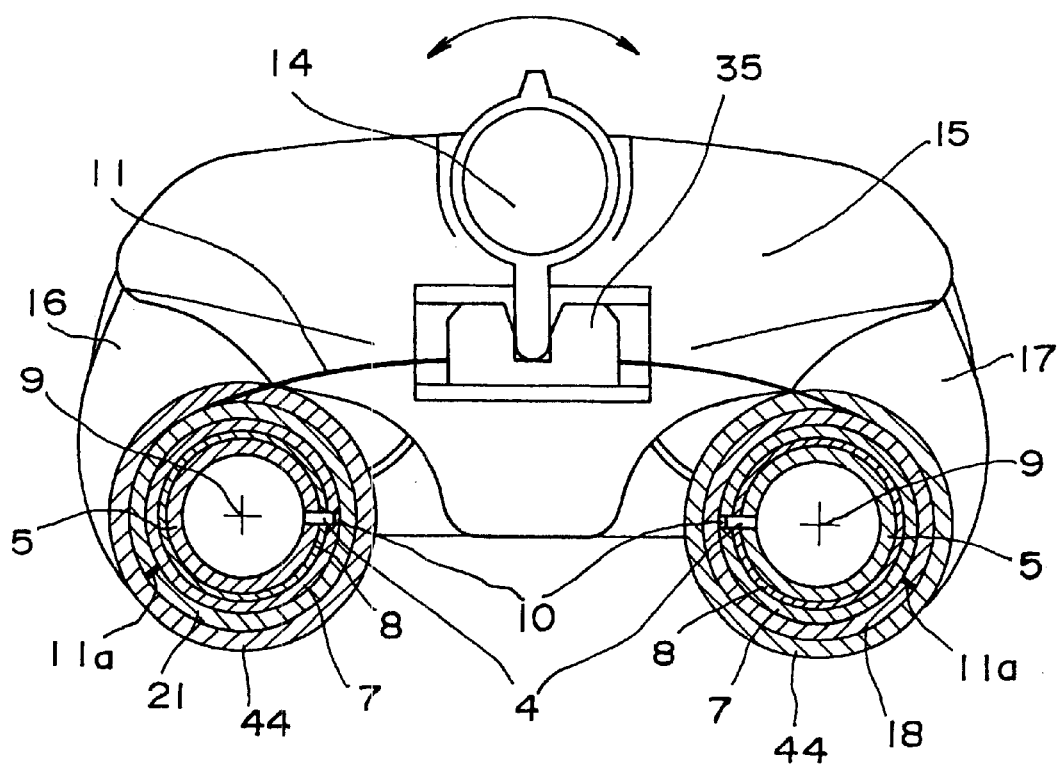
FIG. 9 shows the construction of another conventional pair of zoom binoculars.

FIG. 7 is a transverse sectional front elevation showing the construction of a seventh embodiment of the present invention. As shown in the drawing, this embodiment uses a construction similar to that of the sixth embodiment, in that it comprises zoom binoculars using a large Porro prism. Each cabinet 49 in this drawing houses an object optical system not shown in the drawing. In this embodiment, a zoom operating member 36 is located above the eye distance adjusting axis 22. It is connected to the right zoom drive member 18 by means of a timing belt 34.

As shown in the drawing, by giving the disk unit 36*a* of the zoom operating member 36 and the right zoom drive member 18 the function of a timing pulley and having them engage with the timing belt, the rotational movement may be more reliably transmitted. In all of the embodiments described above, explanations were provided assuming that the right unit of the binoculars is the fixed unit. It is of course acceptable, however, if the left unit is the fixed unit. In that case, the construction should be such that the left and right units are reversed.

As described above, either the left or right zoom drive member is connected to the zoom operating member in a non-integrated fashion for linked operation.

In each construction described above, compact zoom binoculars in which the zoom operating member is located at a position that allows easy operation may be provided.

Further, the zoom operating member may be located at any location.

Moreover, the performance of eye distance adjustment does not affect zooming.

Moreover, the zooming operation may be performed with either hand.

Moreover, the overall size of the binoculars may be reduced.

Although the present invention has been fully described by way of examples with reference to the accompanying drawings, it is to be noted that various changes and modifications will be apparent to those skilled in the art. Therefore, unless otherwise such changes and modifications depart form the scope of the present invention, they should be construed as being included therein.

What is claimed is:

1. Binoculars comprising:

a zoom operating member to be manually operated; and left and right zoom drive members connected to each other for varying the magnification of said binoculars;

wherein one of said left and right zoom drive members is connected to said zoom operating member in a non-integrated fashion to be driven by said zoom operating member, and the other said zoom drive member is connected to said one of the zoom drive members to receive a driving force from said zoom operating member via said one of the zoom drive members.

2. Binoculars according to claim 1 further comprising a connecting member which connects said left and right zoom drive members.

3. Binoculars according to claim 2, wherein said connecting member is located such that it passes through an eye distance adjusting axis.

4. Binoculars according to claim 3, wherein said zoom operating member is located above said eye distance adjusting axis.

5. Binoculars according to claim 1 further comprising a focus drive member for focusing and wherein said zoom operating member is connected to said zoom drive member on the side at which said focus drive member is located.

6. Binoculars according to claim 3, wherein said eye distance adjusting axis is located in the center position of said left and right zoom drive members.

7. Binoculars according to claim 1, wherein said one of the zoom drive members has a gear teeth on outer periphery thereof.

8. Binoculars according to claim 7, wherein said zoom operating member has a gear portion which is connected to said gear teeth of said one of the zoom drive members.

9. Binoculars according to claim 8 further comprising an intermediate gear which meshes with said gear portion of said zoom operating member and said gear teeth of said one of the zoom drive members.

10. Binoculars according to claim 1 further comprising a timing belt which connects said one of the zoom drive members and said zoom operating member.

11. Binoculars according to claim 1, wherein said one of the zoom drive members has a lever on outer periphery thereof.

12. Binoculars according to claim 11, wherein said zoom operating member has a lever which is connected to said lever of said one of the zoom drive members.

13. Binoculars comprising:

an operating member to be manually operated; and left and right drive members connected to each other for moving left and right optical units of said binoculars;

wherein one of said left and right drive members is connected to said operating member in a non-integrated fashion to be driven by said operating member, and the other said drive member is connected to said one of the drive members to receive a driving force from said operating member via said one of the drive members.

14. Binoculars according to claim 13 further comprising a connecting member which connects said left and right drive members.

15. Binoculars according to claim 14, wherein said connecting member is located such that it passes through an eye distance adjusting axis.

16. Binoculars according to claim 13, wherein said one of the drive members has a gear teeth on outer periphery thereof.

17. Binoculars according to claim 16, wherein said operating member has a gear portion which is connected to said gear teeth of said one of the drive members.

18. Binoculars according to claim 17 further comprising an intermediate gear which meshes with said gear portion of said operating member and said gear teeth of said one of the drive members.

19. Binoculars according to claim 13 further comprising a timing belt which connects said one of the drive members and said operating member.

20. Binoculars according to claim 13, wherein said one of the drive members has a lever on outer periphery thereof.

21. Binoculars according to claim 20, wherein said operating member has a lever which is connected to said lever of said one of the drive members.

22. Binoculars according to claim 1, wherein said one of the zoom drive members has teeth for receiving a driving force from said zoom operating member.

23. Binoculars according to claim 22, wherein said zoom operating member has teeth for outputting the driving force.

24. Binoculars according to claim 23 further comprising a transmission member for transmitting the driving force.

25. Binoculars according to claim 24, wherein said transmission member has teeth.

26. Binoculars according to claim 25, wherein said transmission member includes a belt.

27. Binoculars according to claim 1, wherein said zoom operating member has teeth for outputting a driving force toward said one of the zoom drive members.

28. Binoculars according to claim 27 further comprising a transmission member for transmitting the driving force.

29. Binoculars according to claim 28, wherein said transmission member includes a belt.

30. Binoculars according to claim 1, wherein said zoom operating member is located at a center of said left and right zoom drive members.

31. Binoculars according to claim 30, wherein said zoom operating member is located above an eye distance adjusting axis.

32. Binoculars according to claim 30 further comprising a transmission member for transmitting a driving force output from said zoom operating member.

33. Binoculars according to claim 32, wherein said transmission member includes a belt.

34. Binoculars according to claim 13, wherein said one of the drive members has teeth for receiving a driving force from said operating member.

35. Binoculars according to claim 34, wherein said operating member has teeth for outputting the driving force.

36. Binoculars according to claim 35 further comprising a transmission member for transmitting the driving force.

37. Binoculars according to claim 36, wherein said transmission member has teeth.

38. Binoculars according to claim 37, wherein said transmission member includes a belt.

39. Binoculars according to claim 13, wherein said operating member has teeth for outputting a driving force toward said one of the drive members.

40. Binoculars according to claim 39 further comprising a transmission member for transmitting the driving force.

41. Binoculars according to claim 40, wherein said transmission member includes a belt.

42. Binoculars according to claim 13, wherein said operating member is located at a center of said left and right drive members.

43. Binoculars according to claim 42, wherein said operating member is located above an eye distance adjusting axis.

44. Binoculars according to claim 42 further comprising a transmission member for transmitting a driving force output from said operating member.

45. Binoculars according to claim 44, wherein said transmission member includes a belt.

* * * * *